June 3, 1958

C. A. L. RUHL 2,837,114

CONTROL VALVE OF THE TYPE HAVING FLOW CONDUCTING
SLEEVES BIASED AGAINST VALVE CLOSURE MEMBERS

Filed Oct. 4, 1956

2 Sheets-Sheet 1

INVENTOR.
CHARLES A.L. RUHL.
BY
William P. Hickey
ATTORNEY.

June 3, 1958   C. A. L. RUHL   2,837,114
CONTROL VALVE OF THE TYPE HAVING FLOW CONDUCTING
SLEEVES BIASED AGAINST VALVE CLOSURE MEMBERS
Filed Oct. 4, 1956   2 Sheets-Sheet 2

INVENTOR.
CHARLES A.L. RUHL.
BY
William P. Hickey
ATTORNEY.

United States Patent Office 2,837,114
Patented June 3, 1958

2,837,114

CONTROL VALVE OF THE TYPE HAVING FLOW CONDUCTING SLEEVES BIASED AGAINST VALVE CLOSURE MEMBERS

Charles A. L. Ruhl, Kalamazoo, Mich., assignor to Bendix Aviation Corporation, South Bend, Ind., a corporation of Delaware Application October 4, 1956, Serial No. 614,003

11 Claims. (Cl. 137—620)

The present invention relates to valves for controlling fluid flow to and from a fluid pressure chamber; and more particularly to a control valve for controlling flow to and from hydraulic lifts and the like.

An object of the present invention is the provision of a new and improved hydraulic control valve having a control port positioned between opposite end pressure and exhaust ports, and being adapted to alternatively communicate either one of said end ports with said control port while providing a positive seal between the control port and the other of said end ports; said valve requiring a minimum of valve actuating movement to effect large capacity flow in either direction through said control port, and further being capable of hydraulically locking fluid in systems connected to the control port.

A further object of the invention is the provision of a new and improved valve of the above described type which is simple in design, efficient in operation, and inexpensive to manufacture.

A still further object of the invention is the provision of a new and improved valve of the above described type in which a pair of movable sleeves biased against one or more spherically shaped members is provided to effect a fluid tight seal between the control port and the pressure, and exhaust ports, respectively, to make possible the ready attainment of accurate spacing between the fluid sealing and abutment surfaces of the valve during its assembly, and thereby make possible the inexpensive manufacture of a valve in which practically no lost control motion exists.

Figure 1:
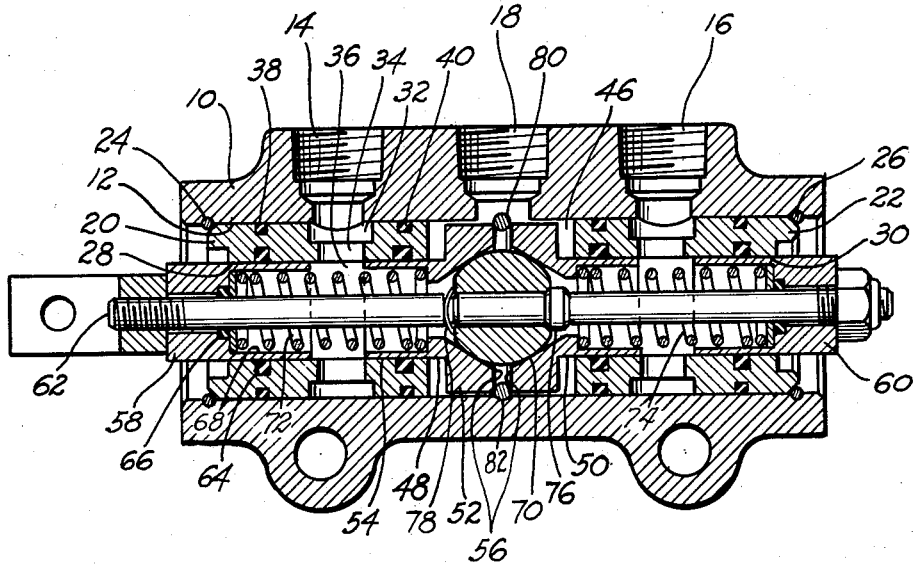
Figure 2:
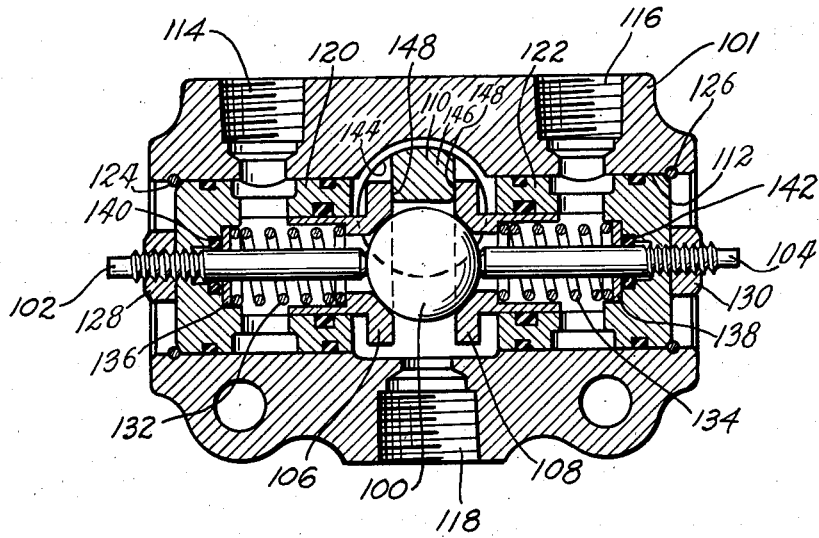
Figure 3:
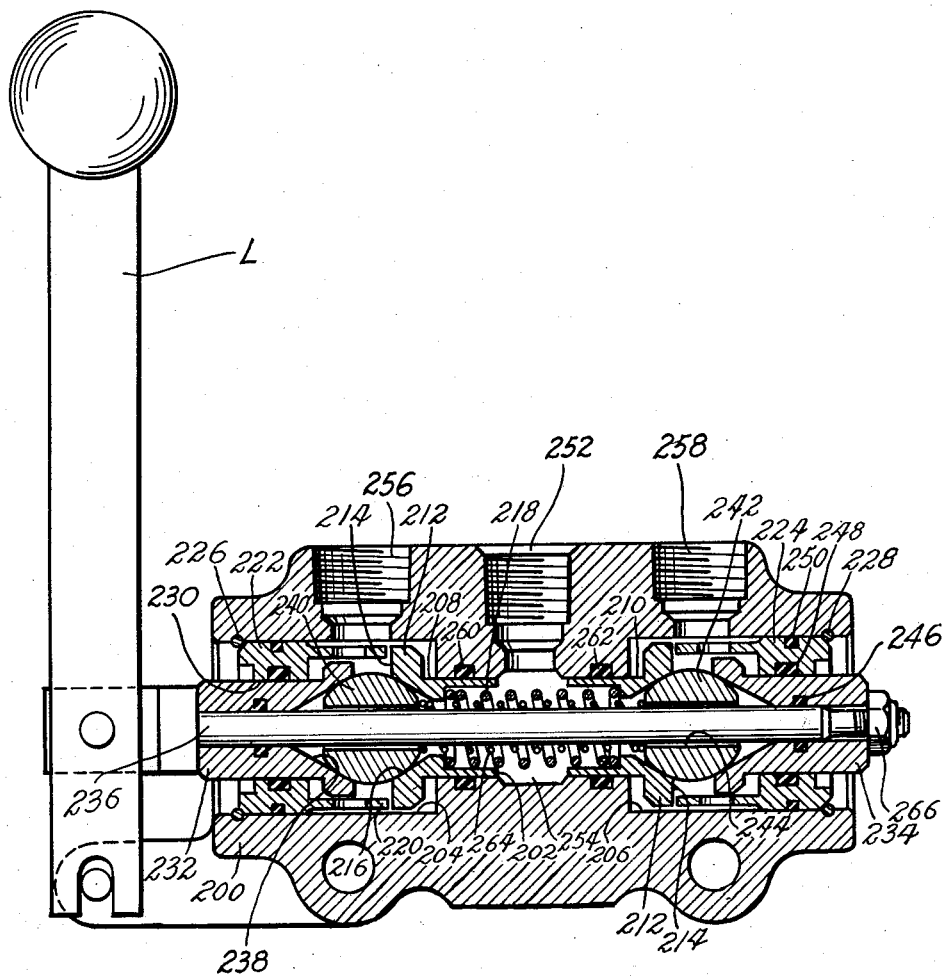

The invention resides in certain constructions, and combinations and arrangements of parts; and further objects and advantages will be apparent to those skilled in the art to which the invention relates from the following description of preferred embodiments described with reference to the accompanying drawings forming a part of this specification, and in which:

Figures 1, 2 and 3 are cross-sectional views showing three respective embodiments of the invention.

While the invention may be otherwise embodied, it is herein shown and described as embodied in a valve for alternatively connecting a control port with pressure and exhaust ports upon movement of a control member to opposite sides of a center position; and which valve will lock fluid in its control port when the control member is in its center position. This type of valving is generally known as a closed center type of valve; and has particular advantages when used in connection with power lift cylinders, as for example, the power lifts on farm tractors and machinery. Valving used to control lifts of this type must be inexpensive, must be rugged and trouble free in operation, and should most preferably be sensitive and devoid of lost control motion.

The embodiment shown in Figure 1 generally comprises a valve body 10 having a longitudinally extending, generally centrally located bore 12 therethrough which communicates opposite end pressure and exhaust ports 14 and 16, respectively, to a control or motor port 18 positioned between the pressure and exhaust ports. Identically shaped annular members or guide sleeves 20 and 22 are positioned in the longitudinally extending bore 12 in the general regions overlying the pressure and exhaust ports 14 and 16, respectively; and are retained in the bore 12 by means of snap rings 24 and 26. It will be seen that the generally tubular nature of guide sleeves 20 and 22 lends itself to well known machining operations which permit accurately sizing and concentrically locating their inner cylindrical surfaces 28 with respect to their outer cylindrical surfaces 30; such that the inner cylindrical surfaces 28 of the guide sleeves 20 and 22 are accurately aligned upon their assembly in the longitudinal bore 12. Each of the sleeves 20 and 22 are provided with an annular recess 32 in their outer cylindrical surfaces overlying the pressure and exhaust ports, respectively; and are further provided with a plurality of radially extending holes 34 therethrough to communicate their recess 32 with the inner chamber 36 of the sleeves. Suitable seals 38 and 40 are provided between the sleeves and the surface of the longitudinal bore 12 to prevent the leakage of fluid there past,—these seals being preferably positioned in grooves formed in the outer surfaces of the sleeves to permit their inexpensive manufacture.

Flow communication between the radially extending holes 34 in the sleeve-like members 20 and 22, and the centrally located chamber 46 positioned between the sleeves is controlled in part by identically shaped annular or sleeve-like valve members 48 and 50 respectively. The sleeve-like valve members 48 and 50 comprise a generally enlarged head like end portion 52 adapted to be positioned within the centrally located chamber 46, and an opposite end tubular projection 54 having an accurate cylindrically formed outer surface adapted to be received in the guide sleeves 20 and 22 respectively. The general sleeve-like nature of the valve members 48 and 50 permits the inexpensive attainment by well known machining methods of an end abutment surface 56 accurately formed transversely to the outer cylindrical surface of the tubular projection 54. The outer ends of the guide sleeves 20 and 22 are closed off by means of identical cylindrically shaped plugs 58 and 60 which are held together by a rod 62 extending lengthwise through the valve. Suitable sliding seals are provided between the respective plugs 58 and 60 and their cooperating guide sleeves 20 and 22 to permit longitudinal movement of the plugs relative to their cooperating sleeves; and still other stationary seals are provided between the respective plugs 58 and 60 and the rod 62 to prevent external leakage from the valve. As shown, the respective seals 64 are provided in individual grooves formed in the inner surface of the respective guide sleeves 20 and 22; and the respective seals 66 are supported in individual grooves positioned in the bottom of a counterbore 68, such that the seals can be continually compressed by means which have still other functions, and which will later be described.

The valve structure is completed by an accurately formed valve closure member 70 carried by the rod 62, and positioned between the sleeve-like valve members 48 and 50. Suitable fluid sealing surfaces are provided on the sleeve-like valve members 48 and 50, and on the valve closure member 70 such that abutment of the members with each other isolates the motor port 18 from the pressure and exhaust ports 14 and 16 respectively. One end of identical springs 72 and 74 are seated in respective counterbores 68 in the plugs 58 and 60 respectively; and the other end of the coil springs 72 and 74 are positioned in respective counterbores formed in the sleeve-like valve members 48 and 50 respectively, to bias the sleeve-like valve members against the valve closure member 70.

The valve closure member 70 is fixed to the rod 62 in any suitable manner, as for example by shoulder 76 and snap fastener 78; such that movement of the rod 62 in one direction causes the valve closure member 70 to move away from one of the sleeves 48 and 50 while more firmly abutting the other of the sleeves; and movement of the closure member 70 in the opposite direction reverses the procedure. A stop or abutment 80 is positioned between the sleeves 48 and 50 to effect separation of the trailing sleeve from the valve closure member 70 as it is moved in the opposite direction; and thus means are provided for alternately opening and closing flow communication between the motor and the pressure and exhaust ports.

Operation of the device is believed to be readily apparent to those skilled in the art. Suffice it to say that movement of the rod 62 to the right, as seen in the drawing, keeps the sleeve 50 firmly in abutment with the closure member 70 preventing flow between the motor and exhaust ports 18 and 16 respectively; while at the same time causing separation of the sleeve 48 from the closure member 70 to open communication between the pressure and motor ports 14 and 18. Similarly, movement in the opposite direction reverses the procedure to exhaust the motor port; and when the closure member is in its center position, the motor port 18 is isolated from both the pressure and exhaust ports.

It will be seen that with such an arrangement, accurately formed and positioned fluid sealing surfaces must exist on both the valve closure member 70 and the sleeve-like members 48 and 50 if a fluid tight seal is to be provided with respect to both sleeves simultaneously. It will further be seen that clearance must be provided between the abutment 80 and the sleeves 48 and 50 if fluid tight abutment is to be achieved between these same sleeves 48 and 50 and the valve closure member 70. Clearance provided between the abutment 80 and the sleeves 48 and 50, however, reflects itself in undesirable lost control motion (i. e. an increment of movement of control rod 62 wherein neither of the sleeves will be separated from the member 70, and no flow control is achieved by the valve). The clearance provided between these members must be sufficient to permit proper seating of the sleeves against valve closure member 70 at all times, and still must be as close as possible to eliminate lost control motion. This necessitates that the distance between the opposite end seating surfaces of the valve closure member 70 be greater than the sum of the distances between the valve seating and end abutment surfaces of the sleeves 48 and 50, plus the width of the abutment 80, by an amount which is equal to the desired clearance between the sleeves 48 and 50 and the abutment 80. This is inexpensively accomplished in the present invention as will hereinafter be described.

It has been previously explained that the end abutment surfaces 56 of the sleeves 48 and 50 are machined square and true with respect to the outer cylindrical surface of the tubular portion 54. The sleeves 48 and 50 are so configured that their fluid sealing surfaces can be formed accurately with respect to the abutment surface 56 during the same chucking of the part, and so the outer cylindrical surface, the fluid sealing surface and the abutment surface can be made accurately with respect to each other. Any suitable curvature can be used for the fluid sealing surface; and in the preferred embodiment is made conical at a predetermined angle such that the diameter and position of the fluid sealing surface can be gauged by the intersection of the seating surface with the abutment or reference surface 56. This can conveniently be machined in a lathe by a prepositioned tool fed at the desired angle to a cross-cut tool used in forming the abutment surface 56; and might conveniently be done by still other machining methods. By this arrangement, axial spacing of the fluid sealing surface of the valve sleeve 48 from its end abutment surface 56 is automatically fixed by the diameter at which the conical surface intersects the abutment surface 56; and in turn is fixed by the positioning of the forming tools. The fixed abutment 80 is made from accurately sized and inexpensive cold drawn wire seated in a groove 82 in the bore 12—which groove 82 need not be accurately positioned lengthwise of the bore. While any valve closure member having oppositely positioned fluid sealing surfaces, accurately made as to diameter and spacing can be used, it has been found that spherically shaped members make excellent valve closure members, and that spherically shaped members, as for example ball bearings, can be inexpensively made to ten thousandths of an inch to simultaneously control the diameter and spacing of their fluid seating surfaces. Accordingly, the valve closure member 70 of the preferred embodiment is a ball bearing drilled to receive the control rod 62; and the fluid sealing surfaces of the cooperating sleeves 48 and 50 are made at a predetermined angle to provide the desired clearance between their abutment surfaces 56 and the fixed abutment 80 at assembly. It will be noted that there are no abutment surfaces which must be formed accurately as a part of the housing member; and that the parts can be assembled without reference to any abutment surfaces formed in the housing member.

The embodiment shown in Figure 2 is in many respects quite similar to that of Figure 1—the main difference being that the valve closure member 100 of this embodiment is held stationary by means of adjustable abutment pins 102 and 104; and the separation of the valve sleeves 106 and 108 from the valve closure member 100 is affected by a movable abutment member 110 positioned between the valve sleeves 106 and 108.

The valve body 101 of this embodiment is provided with a longitudinally extending bore 112 communicating with pressure, exhaust and control ports 114, 116 and 118 respectively, which correspond in size and position with those of Figure 1. The guide sleeves 120 and 122 are quite similar to those of Figure 1 excepting that their outer ends are formed as integral end walls to close off their respective ends of the bore 112. Snap rings 124 and 126, similar to those of Figure 1, are used to retain the guide sleeves within the longitudinal bore 112.

The valve closure member 100 of this embodiment is a ball bearing which need not be further machined in any way. The valve closure member 100 is held in position between the valve sleeves 106 and 108 by the adjustable pins 102 and 104, which pins are threaded through the end walls of the guide sleeves 120 and 122 respectively, and are locked in place by jam nuts 128 and 130. One end of respective coil springs 132 and 134 bias the valve sleeves 106 and 108, respectively, into engagement with the valve closure member 100; and the other end of these springs abuts washers 136 and 138 carried by the guide sleeves 120 and 122 respectively. These same washers 136 and 138 compress suitable seals 140 and 142 to provide a fluid tight seal between the pins 102 and 104 and their supporting guide sleeves.

As previously indicated valve actuating movement in this embodiment is accomplished by means of a movable abutment member 110 positioned between the valve sleeves 106 and 108. The movable abutment member 110 is journalled and suitably sealed in a transverse opening 144 extending through the valve body and intersecting the longitudinal bore 112 intermediate guide sleeves 120 and 122. The movable abutment member 110 is provided with a centrally located, flat portion 146 of generally rectangular cross section extending across the bore between the valve sleeves 106 and 108, and is notched out at the bottom to clear the valve closure member 100. The flat portion 146 is accurately made to predetermined thickness such that predetermined clearance is provided between it and the abutment surfaces 148 of the valve sleeves 106 and 108.

The operation of this embodiment is generally similar to that of Figure 1, excepting that in this case, a handle fixed to the movable abutment member is rotated to cause its flat portion 146 to move against one or the other of the valve sleeves 106 and 108 to cause separation of the valve sleeves from the valve closure member.

The embodiment shown in Figure 3 is the same type of valve generally as shown in Figures 1 and 2; and differs principally from the first two embodiments in that its valve sleeves are positioned with their seating surfaces facing away from each other such that a pair of spherical valve closure members are used for abutment therewith. In the present embodiment, the valve body 200 is provided with a longitudinally extending bore 202 which is counterbored at 204 and 206 adjacent its opposite ends. Identical valve sleeves 208 and 210, similar to those of the previous embodiments, are slidably received in the longitudinal bore 202 with their identical enlarged head portions 212 positioned in the counterbores 204 and 206 respectively. As in the previous embodiments, the identical head portions 212 of the valve sleeves are provided with identical flat end abutment surfaces 214 relative to which a conical valve seating surface 216 is machined. The valve sleeves 208 and 210 are biased towards opposite ends of the valve by a coil spring 218— opposite ends of which are seated in counterbores in the adjacent ends of the sleeves. Outward movement of the sleeves 208 and 210 is limited by identical annular abutment portions 220 of the oppositely facing guide sleeves 222 and 224; which guide sleeves are held within the counterbores 204 and 206 respectively by their respective snap rings 226 and 228. The center opening 230 in each of the identical guide sleeves 222 and 224 is closed off by identical oppositely facing plugs or closure members 232 and 234; and the plugs are adjustably connected together by a rod 236 extending through the longitudinal bore 202. The inner ends of the identical plugs 232 and 234 are slightly enlarged and are each provided with a conical fluid sealing surface 238 identical to those of the valve sleeves 208 and 210. A pair of identical spherical valve closure members 240 and 242 are provided—one between each plug and its cooperating valve sleeve 208 and 210 respectively, such that the spherical valve closure members are normally held between a pair of identical oppositely facing fluid sealing surfaces as in the previous embodiments. Rod 236 extends through similar bores 244 extending through each spherical valve closure member; and suitable seals 246, 248 and 250 respectively are provided at each end of the valve between the rod, plugs, guide sleeves, and surfaces of the counterbores to prevent external leakage from the valve.

The device to be controlled is connected to a control or motor port 252 communicating with the central valve chamber 254 intermediate the valve sleeves 208 and 210; and the pressure and exhaust ports 256 and 258 communicate with the counterbores 204 and 206 respectively. Suitable seals 260 and 262 are provided to prevent leakage past the valve sleeves 208 and 210, respectively; and a coil spring 264 is positioned between the spherical valve closure members 240 and 242 to bias them outwardly into engagement with their cooperating plugs 232 and 234 respectively. After valve assembly, the adjustment nut 266, which is threaded upon rod 236, is tightened until the plugs 232 and 234 firmly seat against their cooperating spherical valve members 240 and 242 to force them into firm engagement with the fluid sealing surfaces of their cooperating valve sleeves 208 and 210 respectively. By a slight additional tightening of the nut 266, just sufficient clearance can be provided to provide satisfactory operation of the valve without introducing an appreciable amount of lost control motion.

The operation of the valve shown in Figure 3 is quite similar to that of the previous two embodiments. Movement of the lever L to the right as seen in the drawing causes the plug 232 to firmly abut the spherical valve closure member 240, and in turn causes the valve closure member 240 to firmly abut the valve sleeve 208 to move the three pieces inwardly against the action of coil spring 218. Simultaneously, the opposite spherical valve closure member 242 is held against its cooperating plug 234 and the two pieces are moved to the right by action of the coil spring 264. Coil spring 218 causes the valve sleeve 210 to follow the closure member 242 until clearance between the sleeve and the abutment portion 220 of the guide sleeve 224 is taken up; and thereafter separation of the sleeve and valve closure member is affected. It will be seen, therefore, that movement of the lever L to the right keeps the pressure port 256 isolated from the motor port 252, and opens communication between the motor port 252 and the exhaust port 258. Movement of the lever L is a left-hand direction reverses the procedure to close communication between the motor port 252 and the exhaust port 258, while opening up communication between the motor port 252 and the pressure port 256. With the valve lever L in its center position, both the exhaust port 258 and the pressure port 256 are isolated from the motor port 252.

It is a further feature of the invention, that the movable valve sleeves 48 and 50, 106 and 108, and 208 and 210 of the respective embodiments are provided with fluid sealing surfaces which abut their cooperating spherical valve closure members on a diameter which corresponds to the outer diameter of their tubular sections. By this expedient, the forces acting upon the valve sleeves are exactly balanced and do not either supplement or decrease the force with which they are biased against their valve closure members. Referring now to Figure 1, it will be seen that the fluid pressure which is communicated to one side of the valve closure member 70 by the pressure port 14 is also communicated to the oppositely facing area of the plug 58. Plug 58 has the same cross sectional area as that of valve sleeve 48, and so the forces oppose each other through rod 62. Likewise the back pressure forces upon the opposite side of the valve closure member 70 from the exhaust port 16 are compensated for by the plug 60; and the valve is therefore balanced under all pressure conditions.

The embodiment shown in Figure 2 is slightly different in that it does have unbalanced pressure forces upon its valve closure member 100; however, the valve closure member 100 of this embodiment is held stationary by the adjustment pins 102 and 104, and so the unbalanced forces have no effect upon the operation of the valve.

The embodiment shown in Figure 3 is likewise a balanced type of construction in which the opposite sides of each valve closure member 240 and 242 is communicated with the motor port 252 through bore 244 in each member—the pressure and exhaust forces being confined to the outer surfaces of their respective closure members, plugs, and valve sleeves.

It will be apparent that the objects heretofore enumerated as well as others have been achieved and that there has been provided a type of valve construction, particularly adaptable to balance, closed center valving, permitting its inexpensive manufacture without excessive lost control motion. While the invention has been described in considerable detail, I do not wish to be limited to the particular constructions shown and described; and it is my intention to cover hereby, all adaptations, modifications and arrangements thereof which come within the practice of those skilled in the art to which the invention relates.

I claim:

1. In a control valve: a body member having a valve chamber connecting a control port with pressure and exhaust ports, said control port being positioned intermediate said pressure and exhaust ports; a pair of annular members each having a generally transverse end abutment surface and each being slidably and sealingly received in said valve chamber with their end abutment surfaces facing in opposite directions, one of said annular members being positioned between said pressure and control ports, and the other of said annular members being positioned between said control and exhaust ports; fluid sealing surfaces formed in said annular members in predetermined relation to said generally transverse abutment surfaces for controlling fluid flow through said annular members; accurately formed valve closure means for abutment with said fluid sealing surfaces; means biasing said annular members in opposite directions toward said valve closure means; abutment means for engagement with said abutment surfaces of said annular members limiting movement in said opposite directions; and means for producing relative movement between said accurately formed valve closure means and said abutment means to control communication between said ports; and whereby generally predetermined clearance is provided between said abutment surfaces and said abutment means when said valve closure means is in engagement with the fluid sealing surfaces of both annular members.

2. In a control valve: a body member having a valve chamber connecting a control port with pressure and exhaust ports, said control port being positioned intermediate said pressure and exhaust ports; a pair of annular members each having a generally transverse end abutment surface and each being slidably and sealingly received in said valve chamber with their end abutment surfaces facing in opposite directions, one of said annular members being positioned between said pressure and control ports, and the other of said annular members being positioned between said control and exhaust ports; fluid sealing surfaces formed in said annular members in predetermined relation to said generally transverse abutment surfaces for controlling fluid flow through said annular members; accurately formed spherically shaped valve closure means for abutment with said fluid sealing surfaces; means biasing said annular members in opposite directions toward said valve closure means; abutment means for engagement with said abutment surfaces of said annular members limiting movement in said opposite directions; and means for producing relative movement between said accurately formed spherically shaped valve closure means and said abutment means to control communication between said ports; and whereby generally predetermined clearance is provided between said abutment surfaces and said abutment means when said valve closure means is in engagement with the fluid sealing surfaces of both annular members.

3. In a control valve: a body member having a valve chamber connecting a control port with pressure and exhaust ports, said control port being positioned intermediate said pressure and exhaust ports; a pair of annular members each having a generally transverse end abutment surface and each being slidably and sealingly received in said valve chamber with their end abutment surfaces facing in opposite directions, one of said annular members being positioned between said pressure and control ports, and the other of said annular members being positioned between said control and exhaust ports; conically shaped fluid sealing surfaces formed in said annular members in predetermined relation to said generally transverse abutment surfaces for controlling fluid flow through said annular members; accurately formed spherically shaped valve closure means for abutment with said conically shaped fluid sealing surfaces; means biasing said annular members in opposite directions toward said valve closure means; abutment means for engagement with said abutment surfaces of said annular members limiting movement in said opposite directions; and means for producing relative movement between said accurately formed spherically shaped valve closure means and said abutment means to control communication between said ports; and whereby generally predetermined clearance is provided between said abutment surfaces and said abutment means when said valve closure means is in engagement with the fluid sealing surfaces of both annular members.

4. In a control valve: a body member having a valve chamber connecting a control port with pressure and exhaust ports, said control port being positioned intermediate said pressure and exhaust ports; a pair of annular members each having a generally transverse end abutment surface and each being slidably and sealingly received in said valve chamber with their end abutment surfaces facing in opposite directions, one of said annular members being positioned between said pressure and control ports, and the other of said annular members being positioned between said control and exhaust ports; conically shaped fluid sealing surfaces formed in said annular members in predetermined relation to said generally transverse abutment surfaces for controlling fluid flow through said annular members; accurately formed spherically shaped valve closure means for abutment with said conically shaped fluid sealing surfaces; means biasing said annular members in opposite directions toward said valve closure means; abutment means for engagement with said abutment surfaces of said annular members limiting movement in said opposite directions; and means for producing relative movement between said accurately formed spherically shaped valve closure means and said abutment means to control communication between said ports; and said fluid sealing surfaces of said annular members and said valve closure means being generally of the same diameter as the outer sliding sealing surface of said annular members to provide a substantially balanced valve construction.

5. In a control valve: a body member having a valve chamber connecting a control port with pressure and exhaust ports, said control port being positioned intermediate said pressure and exhaust ports; a pair of annular members each having a flat generally transverse end abutment surface and each being slidably and sealingly received in said valve chamber with their end abutment surfaces facing each other, one of said annular members being positioned between said pressure and control ports, and the other of said annular members being positioned between said control and exhaust ports; fluid sealing surfaces formed in said annular members in predetermined relation to said generally transverse abutment surfaces for controlling fluid flow through said annular members; an accurately formed valve closure member positioned between said annular members for simultaneous abutment with their fluid sealing surfaces; means biasing said annular members toward each other; and abutment means of predetermined width for engagement with said abutment surfaces of said annular members to limit movement of said annular members toward each other, whereby generally predetermined clearance is provided between said abutment surfaces and said abutment means when said valve closure member is in engagement with the fluid sealing surfaces of both annular members.

6. In a control valve: a body member having a valve chamber connecting a control port with pressure and exhaust ports, said control port being positioned intermediate said pressure and exhaust ports; a pair of annular members each having a flat transverse end abutment surface and each being slidably and sealingly received in said valve chamber with their end abutment surfaces facing each other, one of said annular members being positioned between said pressure and control ports, and the other of said annular members being positioned between said control and exhaust ports; fluid sealing surface formed in said annular members in predetermined relation to said transverse abutment surfaces for controlling fluid flow through said annular members; an accurately formed valve closure member positioned between said annular members for simultaneous abutment with their fluid sealing surfaces, said fluid sealing surfaces being shaped to abut with said valve closure member on a diameter substantially equal to that of the sealing surface of said annular members; means biasing said annular members toward each other; and abutment means of predetermined width for engagement with said abutment surfaces of said annular members to limit movement of said annular members toward each other, whereby generally predetermined clearance is provided between said abutment surfaces and said abutment means when said valve closure member is in engagement with the fluid sealing surfaces of both annular members.

7. In a control valve: a body member having a valve chamber connecting a control port with pressure and exhaust ports, said control port being positioned intermediate said pressure and exhaust ports; a pair of annular members each having a flat transverse end abutment surface and each being slidably and sealingly received in said valve chamber with their end abutment surfaces facing each other, one of said annular members being positioned between said pressure and control ports, and the other of said annular members being positioned between said control and exhaust ports; conically shaped fluid sealing surfaces formed in said annular members in predetermined relation to said transverse abutment surfaces for controlling fluid flow through said annular members; an accurately formed spherically shaped valve closure member positioned between said annular members for simultaneous abutment with their fluid sealing surfaces; means biasing said annular members toward each other; and abutment means of predetermined width for engagement with said abutment surfaces of said annular members to limit movement of said annular members toward each other, whereby generally predetermined clearance is provided between said abutment surfaces and said abutment means when said valve closure member is in engagement with the fluid sealing surfaces of both annular members.

8. In a control valve: a body member having a valve chamber connecting a control port with pressure and exhaust ports, said control port being positioned intermediate said pressure and exhaust ports; a pair of annular members each having a flat transverse end abutment surface and each being slidably and sealingly received in said valve chamber with their end abutment surfaces facing each other, one of said annular members being positioned between said pressure and control ports, and the other of said annular members being positioned between said control and exhaust ports; conically shaped fluid sealing surfaces formed in said annular members in predetermined relation to said transverse abutment surfaces for controlling fluid flow through said annular members; an accurately formed spherically shaped valve closure member positioned between said annular members for simultaneous abutment with their fluid sealing surfaces; means biasing said annular members toward each other; stationary abutment means of predetermined width for engagement with said abutment surfaces of said annular members limiting movement of said annular members toward each other; and means for moving said valve closure member relative to said abutment means for controlling flow through said valve; whereby generally predetermined clearance is provided between said abutment surfaces and said abutment means when said valve closure member is in engagement with the fluid sealing surfaces of both annular members.

9. In a control valve: a body member having a valve chamber connecting a control port with pressure and exhaust ports, said control port being positioned intermediate said pressure and exhaust ports; a pair of annular members each having a flat transverse end abutment surface and each being slidably and sealingly received in said valve chamber with their end abutment surfaces facing each other, one of said annular members being positioned between said pressure and control ports, and the other of said annular members being positioned between said control and exhaust port; fluid sealing surfaces formed in said annular members in predetermined relation to said transverse abutment surfaces for controlling fluid flow through said annular members; an accurately formed spherically shaped valve closure member positioned between said annular members for simultaneous abutment with their fluid sealing surfaces; means biasing said annular members toward each other; abutment means of predetermined width for engagement with said abutment surfaces of said annular members limiting movement of said annular members toward each other; and adjustable means for positioning said accurately formed valve closure member relative to said abutment means, whereby generally predetermined clearance is provided between said abutment surfaces and said abutment means when said valve closure member is in engagement with the fluid sealing surfaces of both annular members.

10. In a control valve: a body member having a cylindrical bore therein connecting a control port with pressure and exhaust ports, said control port being positioned intermediate said pressure and exhaust ports; a pair of identical guide sleeves positioned on opposite sides of said control port, a pair of identical valve sleeves each having a flat transverse end abutment surface and each being slidably and sealingly received in one of said guide sleeves with their end abutment surfaces facing each other, one of said valve sleeves being positioned between said pressure and control ports, and the other of said valve sleeves being positioned between said control and exhaust ports; conically shaped fluid sealing surfaces formed in said valve sleeves in predetermined relation to said transverse abutment surfaces for controlling fluid flow through said valve sleeves; and accurately formed spherically shaped valve closure member positioned between said valve sleeves for simultaneous abutment with their fluid sealing surfaces, said fluid sealing surfaces being shaped to abut with said valve closure member on a diameter substantially equal to that of the sliding sealing surface of said valve sleeves; a pair of plugs of substantially the same diameter as said valve sleeves and positioned in respective ones of said guide sleeves to close off opposite ends of the valve; a rod connecting said plugs with said valve closure member; a pair of springs each positioned between a respective one of said plugs and its adjacent valve sleeve for biasing said valve sleeves against said valve closure member; and abutment means of generally predetermined width for engagement with said abutment surfaces of said annular members to limit movement of said annular members toward each other; whereby an essentially balanced valve construction is achieved.

11. In a control valve: a body member having a generally cylindrical valve chamber the opposite ends of which are enlarged, said body member also having a control port communicating with the smaller center portion of said chamber, and pressure and exhaust ports communicating with respective ones of said enlarged end portions; a pair of valve sleeves each having a flat transverse end abutment surface, and being slidably and sealingly received in opposite ends of said center portion of said valve chamber with their abutment surfaces facing the adjacent enlarged portions of said valve chamber; a pair of annular guide members positioned in respective enlarged portions of said valve chamber and having abutment surfaces thereon for limiting endwise movement of said valve sleeves, the inside diameter of said annular members generally corresponding to the outside diameter of said valve sleeves; a pair of movable plugs sealingly received in respective ones of said annular guide members; a coil spring positioned between said valve sleeves for urging them in abutment with said abutment surfaces; a pair of spherically shaped valve closure members each positioned between a plug and valve sleeve in respective enlarged portions of said valve chamber, said valve closure members having longitudinally extending openings therethrough; generally conically shaped seating surfaces formed in said plugs and valve sleeves for abutment with said valve closure members surrounding their horizontally extending openings; and a rod adjustably connecting said movable plugs.

References Cited in the file of this patent

UNITED STATES PATENTS

| | | |
|---|---|---|
| 2,361,130 | Simpson | Oct. 24, 1944 |
| 2,637,303 | Gintron | May 5, 1953 |